(12) United States Patent
Nolan

(10) Patent No.: US 11,970,978 B2
(45) Date of Patent: Apr. 30, 2024

(54) ACOUSTIC PANEL AND METHOD OF FORMING SAME

(71) Applicant: Rohr, Inc., Chula Vista, CA (US)

(72) Inventor: Patrick J. Nolan, Laguna Hills, CA (US)

(73) Assignee: ROHR, INC., Chula Vista, CA (US)

( * ) Notice: Subject to any disclaimer, the term of this patent is extended or adjusted under 35 U.S.C. 154(b) by 119 days.

(21) Appl. No.: 17/358,770

(22) Filed: Jun. 25, 2021

(65) Prior Publication Data

US 2022/0412265 A1 Dec. 29, 2022

(51) Int. Cl.
*F02C 7/24* (2006.01)
*F02C 7/045* (2006.01)

(52) U.S. Cl.
CPC ............... *F02C 7/24* (2013.01); *F02C 7/045* (2013.01); *F05D 2220/323* (2013.01); *F05D 2230/23* (2013.01); *F05D 2260/96* (2013.01)

(58) Field of Classification Search
CPC ........ F02C 7/24; F02C 7/045; F05D 2260/96; F05D 2230/23; F05D 2220/323; B64D 2033/0206; B64D 2033/02; E04B 1/74; E04B 2001/748
See application file for complete search history.

(56) References Cited

U.S. PATENT DOCUMENTS

| | | | |
|---|---|---|---|
| 5,476,237 A | 12/1995 | Clarke | |
| 5,776,579 A * | 7/1998 | Jessup | B32B 3/266 |
| | | | 428/317.5 |
| 7,923,668 B2 * | 4/2011 | Layland | B64D 15/12 |
| | | | 219/535 |
| 8,251,174 B2 * | 8/2012 | Welch | G10K 11/16 |
| | | | 181/292 |
| 8,747,586 B2 | 6/2014 | Collins | |
| 9,421,703 B2 | 8/2016 | Schulte | |
| 9,779,715 B1 * | 10/2017 | Seldal | B31D 3/0292 |
| 9,783,316 B2 * | 10/2017 | Alonso-Miralles | B64D 33/06 |
| 9,855,626 B2 * | 1/2018 | Tiwari | F01D 25/24 |
| 10,507,931 B2 * | 12/2019 | Soria | B32B 7/12 |
| 10,810,988 B2 | 10/2020 | Wadsworth | |
| 11,414,203 B2 * | 8/2022 | Sanz Martinez | B64C 7/02 |
| 11,414,858 B2 * | 8/2022 | Aten | G10K 11/172 |
| 2007/0267246 A1 * | 11/2007 | Ali | G10K 11/175 |
| | | | 181/210 |
| 2008/0179448 A1 | 7/2008 | Layland | |
| 2011/0131945 A1 * | 6/2011 | Vauchel | B64D 33/02 |
| | | | 428/116 |
| 2011/0232833 A1 * | 9/2011 | Collins | F01D 11/127 |
| | | | 156/165 |

(Continued)

OTHER PUBLICATIONS

EP search report for EP22181381.9 dated Oct. 20, 2022.

*Primary Examiner* — Topaz L. Elliott
*Assistant Examiner* — Ryan C Clark
(74) *Attorney, Agent, or Firm* — Getz Balich LLC

(57) ABSTRACT

An acoustic panel includes a front skin comprising a plurality of apertures, a back skin, and a core positioned between the front skin and the back skin. The core includes at least one primary core portion including a honeycomb structure defining a plurality of cavities extending from the front skin to the back skin. The core further includes a secondary core portion external to the at least one primary core portion and including a foam structure extending from the front skin to the back skin.

11 Claims, 7 Drawing Sheets

(56) References Cited

U.S. PATENT DOCUMENTS

| | | | |
|---|---|---|---|
| 2014/0367512 A1 | 12/2014 | Dean | |
| 2015/0063932 A1* | 3/2015 | Zubin | F02C 7/045 |
| | | | 408/1 R |
| 2016/0003106 A1* | 1/2016 | Fouquet | C04B 37/005 |
| | | | 427/255.12 |
| 2019/0172438 A1* | 6/2019 | Wadsworth | F02C 7/045 |
| 2021/0163143 A1* | 6/2021 | Mercat | B32B 5/245 |

* cited by examiner

ACOUSTIC PANEL AND METHOD OF FORMING SAME

BACKGROUND

1. Technical Field

This disclosure relates generally to gas turbine engines, and more particularly to acoustic panels for gas turbine engines.

2. Background Information

Acoustic attenuation panels are known for lining the walls of nacelles of aircraft jet engines. Generally, acoustic panels may include a cellular core having a honeycomb structure and covered on its exterior sides by a front skin and, on the opposite side, by a back skin. The front skin may include a plurality of spaced-apart holes or perforations. In this configuration, the cavities of the core, covered by the front skin and the back skin, may form resonant cavities that contribute to the dissipation of incident acoustic energy by canceling acoustically reflected waves and/or converting acoustic energy into heat, such as by Helmholtz resonance.

In an effort to produce lightweight acoustic panels while minimizing costs, manufactures have increasingly used front and back skins made from composite materials. The front and back skins may generally include multiple layers of composite material and may be shaped in an uncured state while the composite material is substantially ductile. The composite skins may then be cured to obtain the necessary rigidity and structural strength for operational use. However, current methods of manufacturing conventional acoustic panels with composite skins can be time consuming and expensive. Accordingly, there is a need for improved acoustic panels and methods of making acoustic panels.

SUMMARY

It should be understood that any or all of the features or embodiments described herein can be used or combined in any combination with each and every other feature or embodiment described herein unless expressly noted otherwise.

According to an aspect of the present disclosure, an acoustic panel includes a front skin comprising a plurality of apertures, a back skin, and a core positioned between the front skin and the back skin. The core includes at least one primary core portion including a honeycomb structure defining a plurality of cavities extending from the front skin to the back skin. The core further includes a secondary core portion external to the at least one primary core portion and including a foam structure extending from the front skin to the back skin.

In any of the aspects or embodiments described above and herein, the foam structure comprises a syntactic foam.

In any of the aspects or embodiments described above and herein, the front skin includes a perforated skin portion including the plurality of apertures. The perforated skin portion is coincident with the at least one primary core portion. The front skin further includes an imperforate skin portion coincident with the secondary core portion.

In any of the aspects or embodiments described above and herein, the front skin and the back skin include a composite material.

In any of the aspects or embodiments described above and herein, the acoustic panel further includes a transition portion defined by at least one curve of one or both of the front skin and the back skin.

In any of the aspects or embodiments described above and herein, the front skin is separated from the back skin by a distance and wherein the distance is inconsistent within the transition portion along a span of the transition portion from a first transition portion end to a second transition portion end.

In any of the aspects or embodiments described above and herein, the secondary core portion is disposed within the transition portion.

In any of the aspects or embodiments described above and herein, the secondary core portion is in contact with both of the front skin and the back skin within the transition portion.

In any of the aspects or embodiments described above and herein, the acoustic panel further includes an end portion where the front skin contacts the back skin. The end portion is adjacent the transition portion.

In any of the aspects or embodiments described above and herein, the secondary core portion extends from the primary core portion to the end portion of the acoustic panel.

In any of the aspects or embodiments described above and herein, the at least one primary core portion includes a first primary core portion and a second primary core portion and the first primary core portion and the second primary core portion are separated from one another by the transition portion of the acoustic panel and the secondary core portion.

According to another aspect of the present disclosure, a method is provided for forming an acoustic panel. The method includes providing a front skin and a back skin and assembling the acoustic panel by positioning a core between the front skin and the back skin. The core includes at least one primary core portion including a honeycomb structure defining a plurality of cavities extending from the front skin to the back skin. The core further includes a secondary core portion external to the at least one primary core portion and including a foam structure extending from the front skin to the back skin. The method further includes simultaneously curing the front skin and the back skin subsequent to assembling the acoustic panel.

In any of the aspects or embodiments described above and herein, the foam structure includes a syntactic foam.

In any of the aspects or embodiments described above and herein, the front skin and the back skin include a composite material.

In any of the aspects or embodiments described above and herein, the step of providing the front skin and the back skin includes providing the front skin and the back skin in an uncured state.

In any of the aspects or embodiments described above and herein, the step of assembling the acoustic panel further includes bonding the front skin and the back skin to the core with a structural adhesive bonding material.

In any of the aspects or embodiments described above and herein, the method further includes perforating a perforated skin portion of the front skin to form a plurality of apertures subsequent to simultaneously curing the front skin, the back skin, and the secondary core portion. The perforated skin portion is coincident with the primary core portion.

In any of the aspects or embodiments described above and herein, the front skin further includes an imperforate skin portion coincident with the secondary core portion.

In any of the aspects or embodiments described above and herein, the acoustic panel includes a transition portion defined by at least one curve of one or both of the front skin and the back skin. The secondary core portion is disposed within the transition portion.

In any of the aspects or embodiments described above and herein, the method further includes curing the secondary core portion to the at least one primary core portion prior to the step of assembling the acoustic panel.

The present disclosure, and all its aspects, embodiments and advantages associated therewith will become more readily apparent in view of the detailed description provided below, including the accompanying drawings.

DETAILED DESCRIPTION

Figure 1:
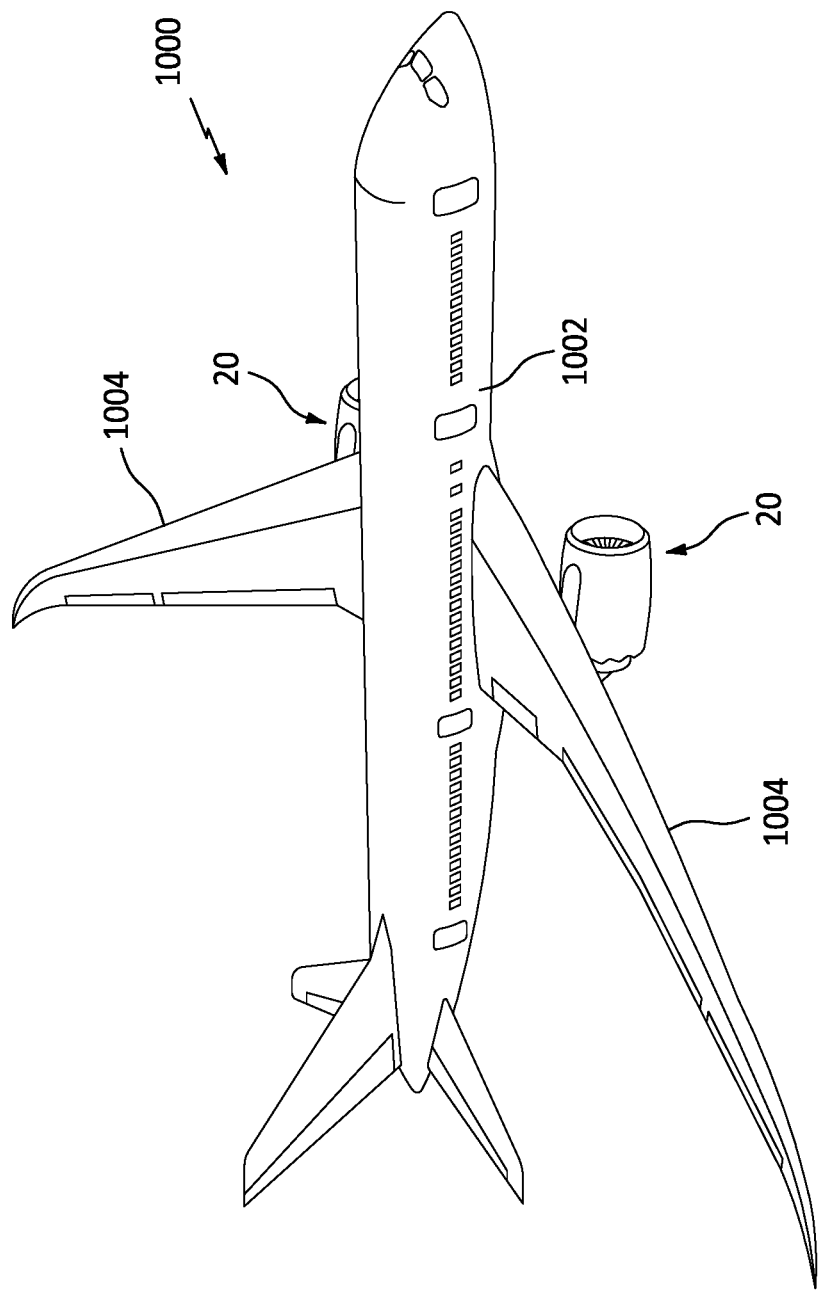
FIG. 1 illustrates a perspective view of an aircraft, in accordance with one or more embodiments of the present disclosure.
Figure 2:
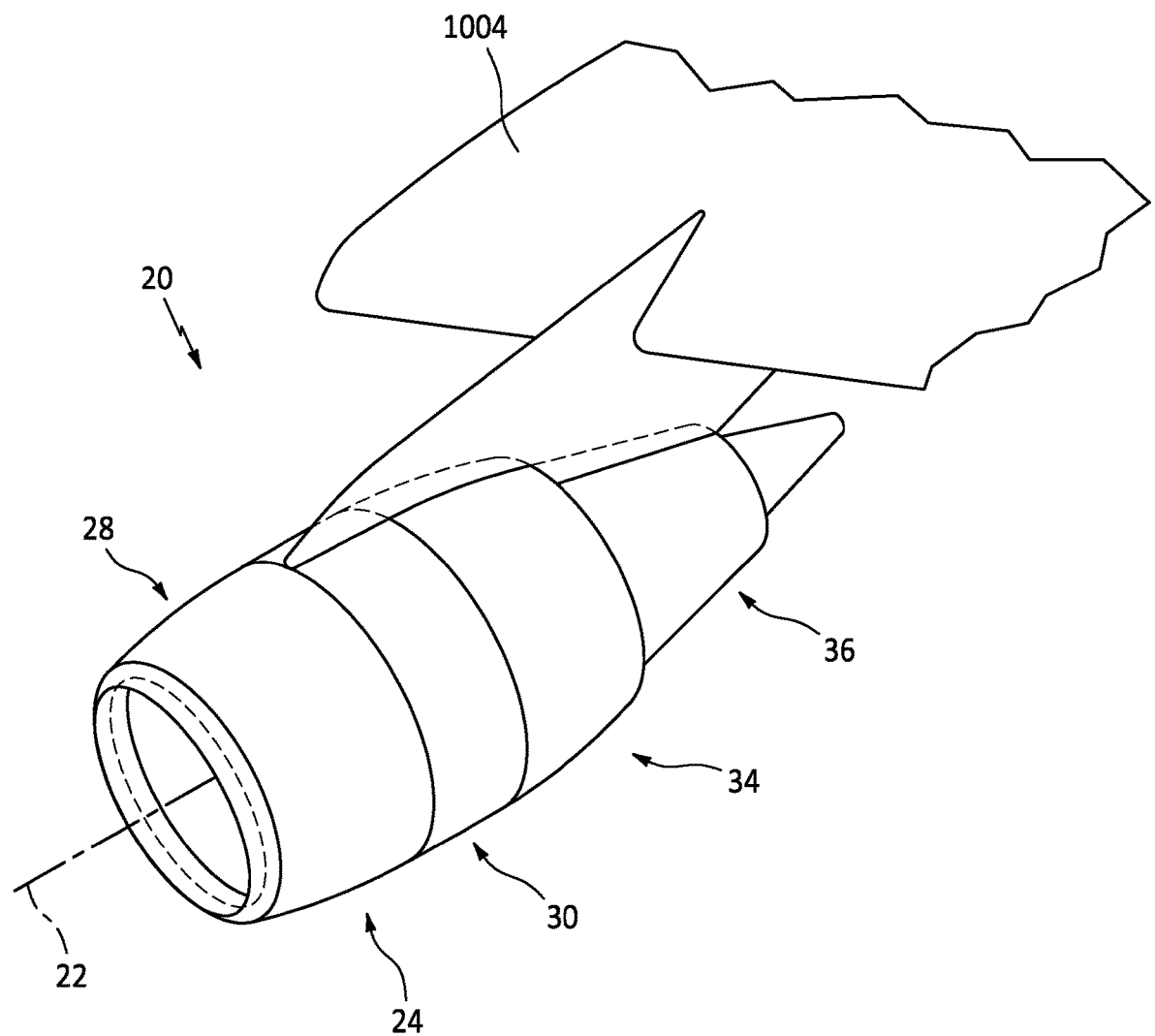
FIG. 2 illustrates a perspective view of a gas turbine engine, in accordance with one or more embodiments of the present disclosure.
Figure 3:
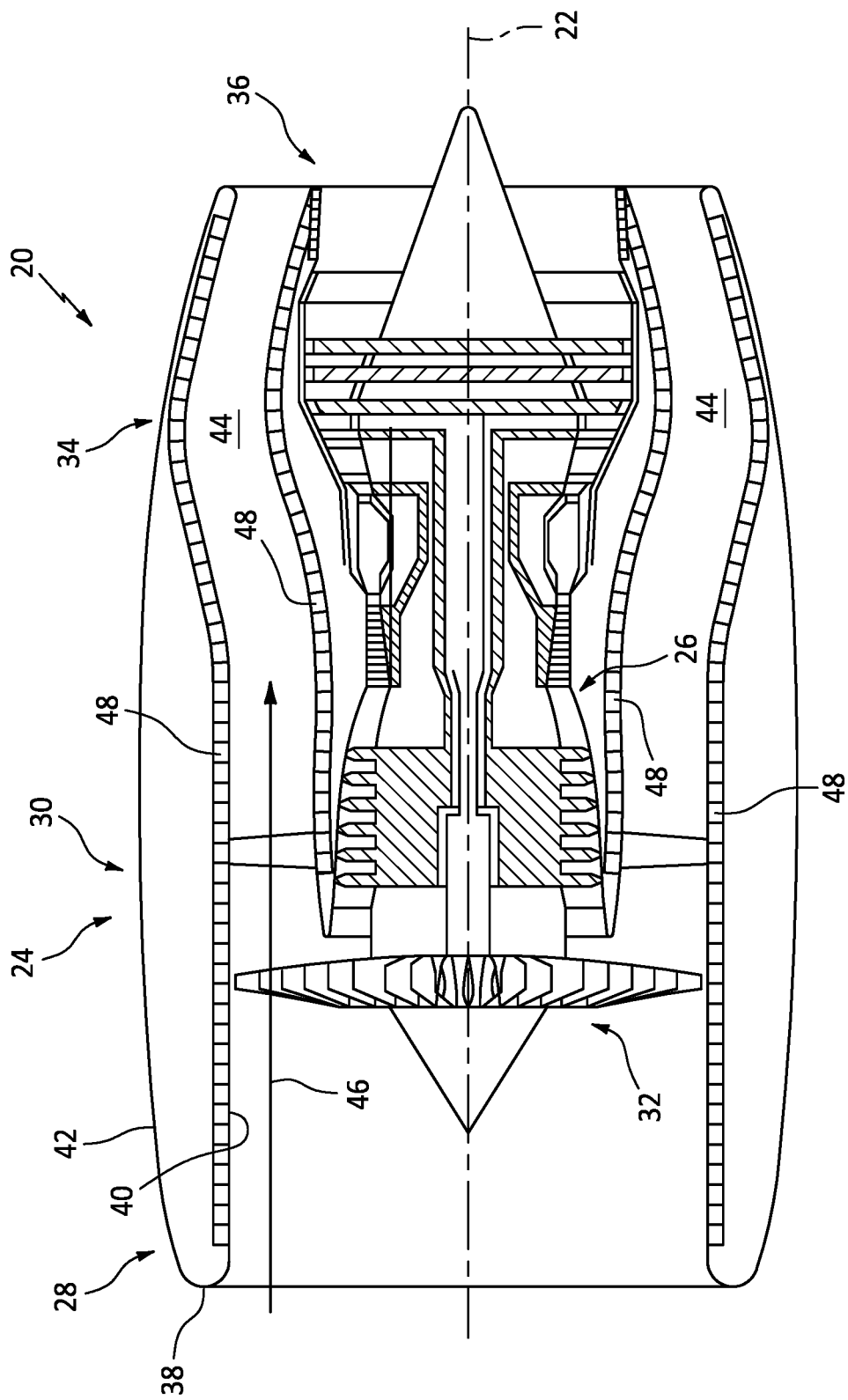
FIG. 3 illustrates a side, cross-sectional view of the gas turbine engine of FIG. 2, in accordance with one or more embodiments of the present disclosure.

Referring to FIGS. 1-3, a perspective view of an aircraft 1000 is shown in FIG. 1. The aircraft 1000 includes a fuselage 1002 and wings 1004 which extend outwardly from the fuselage 1002. The aircraft 1000 may include one or more propulsion systems which may be supported, for example, by the wings 1004 of the aircraft 1000. The propulsion systems may include a gas turbine engine such as the gas turbine engine 20 illustrated in FIGS. 1-3.

The gas turbine engine 20 is centered about a longitudinal center axis 22. The gas turbine engine 20 includes a nacelle 24 forming an outer perimeter of the gas turbine engine 20 about the longitudinal center axis 22 and serving to generally house an engine core 26. The nacelle 24 may include an inlet portion 28 located at a forward end of the gas turbine engine 20, a fan cowl 30 surrounding one or more fans 32 of the engine core 26, a translating sleeve 34, and an exhaust nozzle 36 located at an aft end of the gas turbine engine 20. The inlet portion 28 includes a leading edge 38. The inlet portion 28 further includes an inner barrel 40 extending from the leading edge 38 and defining an inner radial surface of the inlet portion 28 and an outer barrel 42 extending from the leading edge 38 and defining an outer radial surface of the inlet portion 28. An annular bypass duct 44 is generally defined between the nacelle 24 and the engine core 26. At least a portion of the air entering the inlet portion 28 will pass through the bypass duct 44 along a bypass flow path 46 through the gas turbine engine 20.

Referring to FIG. 3, the present disclosure includes one or more acoustic panels 48 configured to attenuate noise generated by an aircraft propulsion system such as the gas turbine engine 20 or, for example, alternative turbofan or turbojet propulsion systems. The acoustic panels 48 may be configured to form part of the nacelle 24. For example, the acoustic panels 48 may be attached to or configured to form part of the inner barrel 40, the outer barrel 42, the fan cowl 30, the translating sleeve 34, the exhaust nozzle 36, etc. The acoustic panels 48 may also be attached to or configured to form part of the engine core 26. The acoustic panels 48 may, for example, line all or a portion of the bypass flow path 46. Alternatively, the acoustic panels 48 may form part of another component/structure of the aircraft 1000 such as the fuselage 1002 or wings 1004. Furthermore, the acoustic panels 48 may be configured to additionally or alternatively attenuate aircraft related noise other than that generated by a propulsion system. However, it should be understood that the acoustic panels 48 of the present disclosure are not limited to use in aircraft applications or propulsion systems and may be applied to any other vehicle, application, or environment where noise suppression, and particularly low frequency noise suppression, is desirable.

Figure 4:
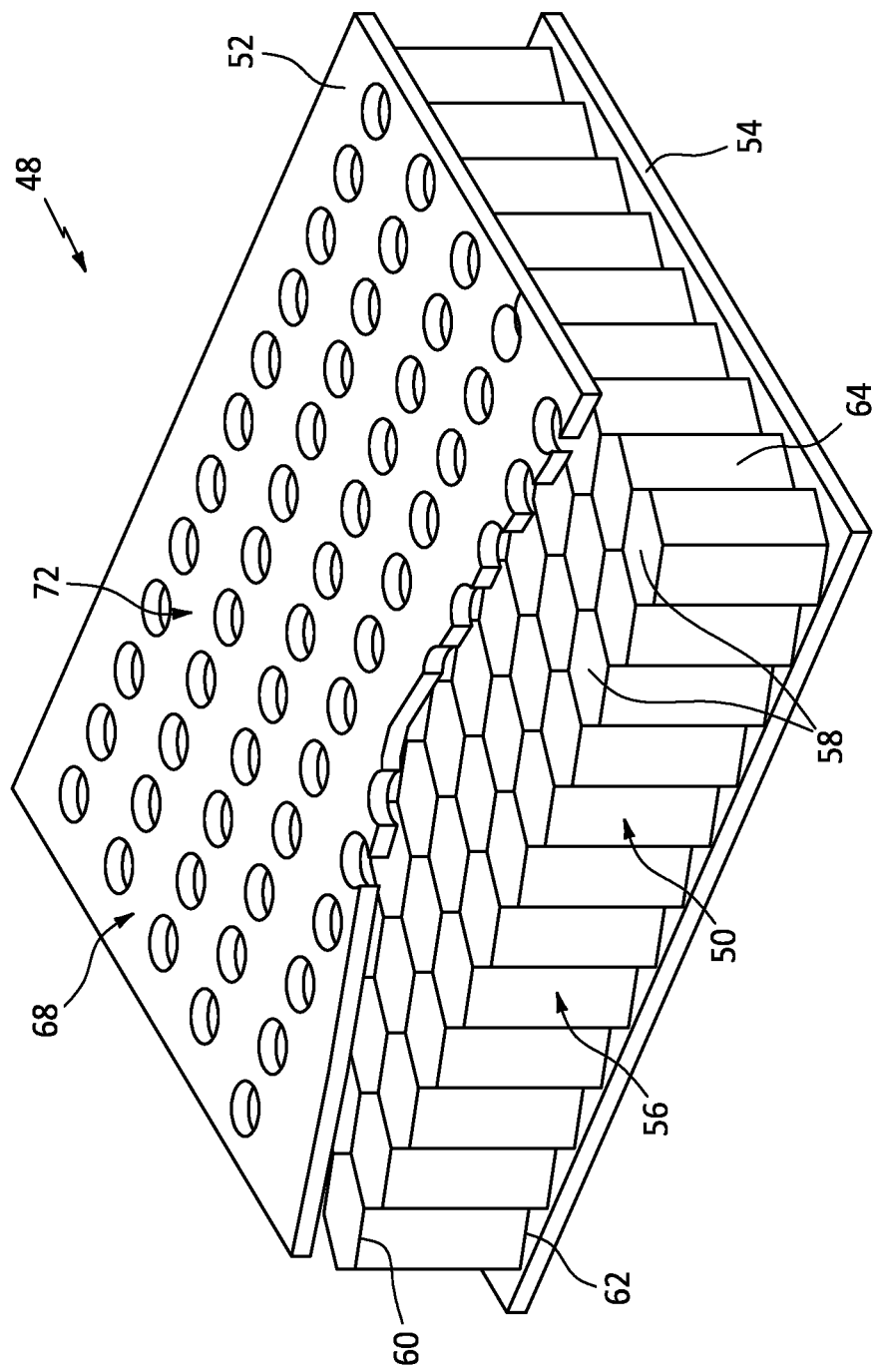
FIG. 4 illustrates a perspective, cut-away view of a portion of an acoustic panel, in accordance with one or more embodiments of the present disclosure.
Figure 5:
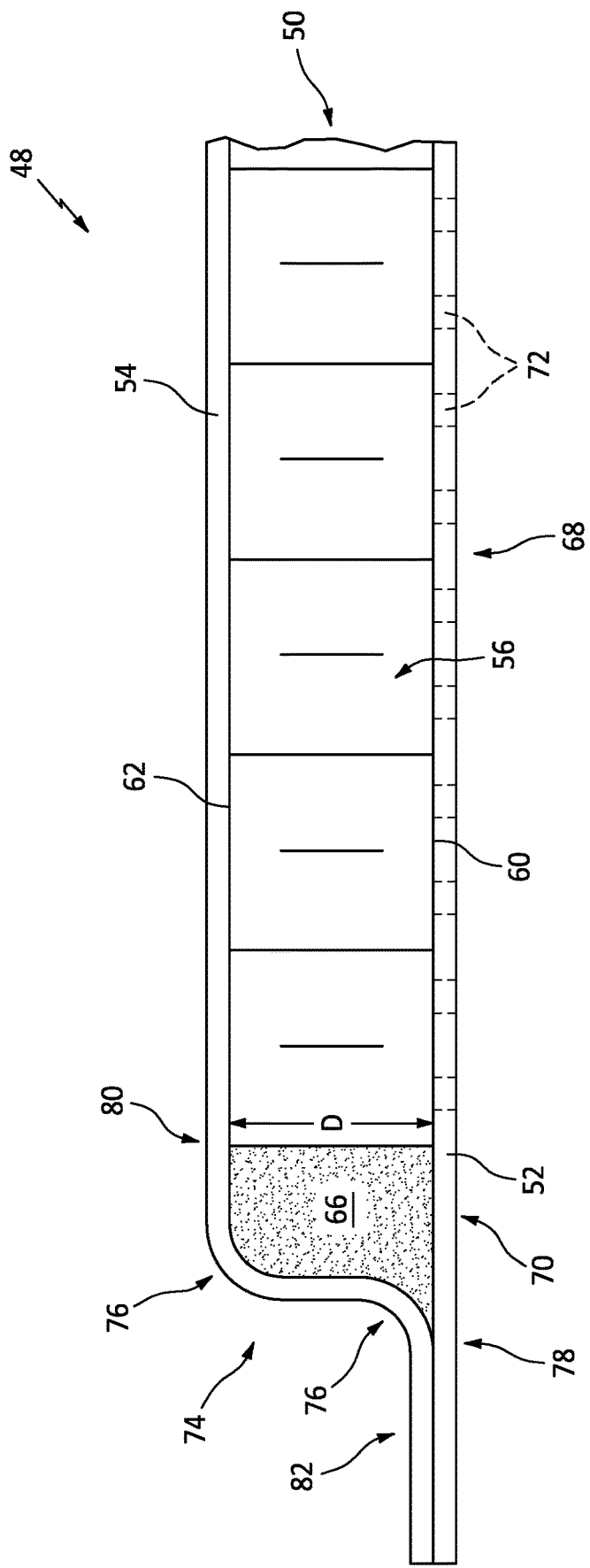
FIG. 5 illustrates a side, cross-sectional view of a portion of an acoustic panel, in accordance with one or more embodiments of the present disclosure.
Figure 6:
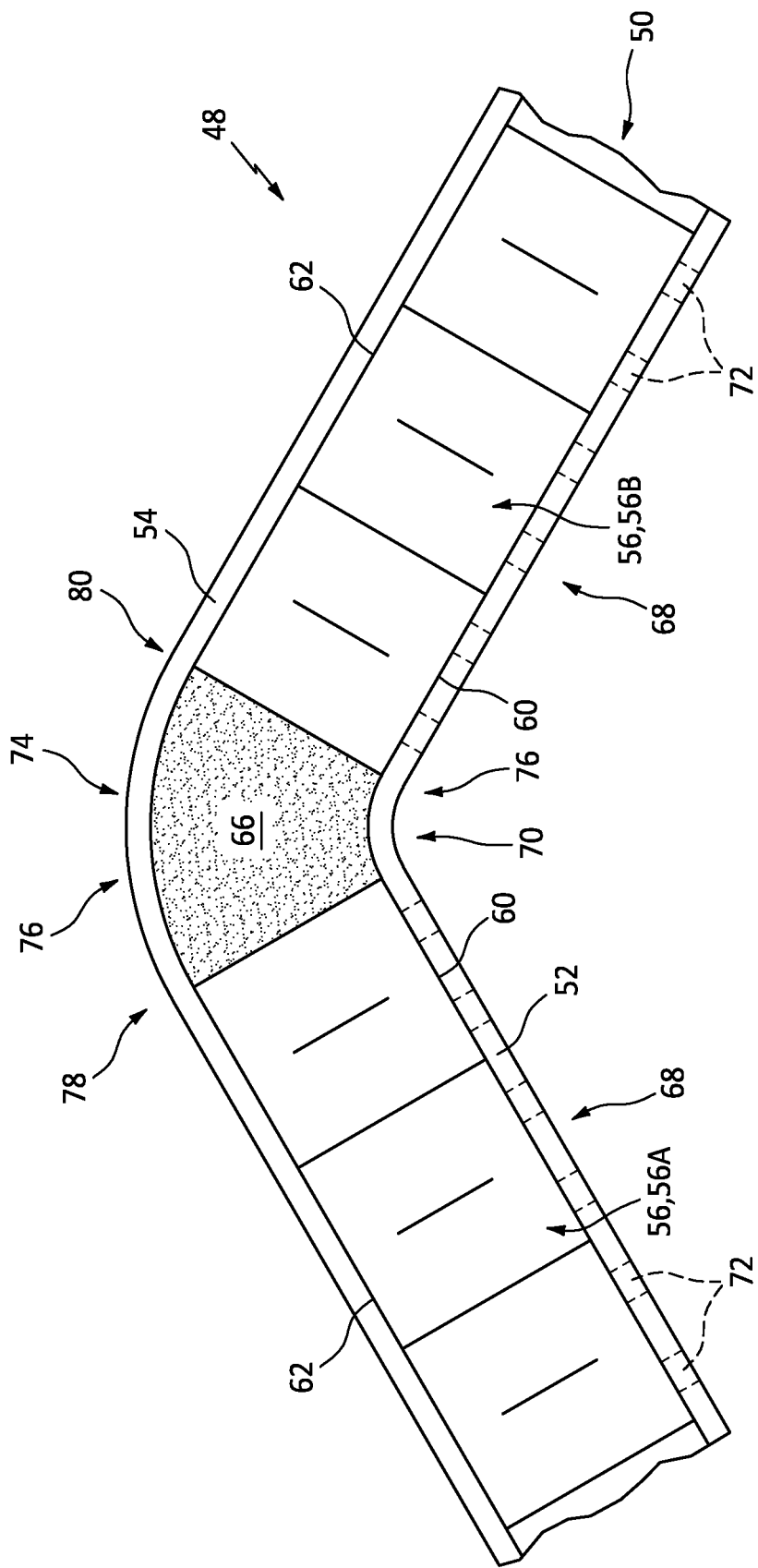
FIG. 6 illustrates a side, cross-sectional view of a portion of an acoustic panel, in accordance with one or more embodiments of the present disclosure.

Referring to FIGS. 4-6, the acoustic panel 48 according to the present disclosure generally includes a core 50 positioned between a perforated front skin 52 and an imperforate back skin 54. As shown, for example, in FIG. 4, the core 50 has one or more primary core portions 56. The primary core portion 56 includes a plurality of cavities 58 extending from a first side 60 of the primary core portion 56 to a second side 62 of the primary core portion 56 opposite the first side 60. The primary core portion 56 is positioned between and in contact with the front skin 52 and the back skin 54 such that the front skin 52 and the back skin 54 bound opposing ends of the plurality of cavities 58 along the first side 60 and the second side 62 of the primary core portion 56, respectively. In various embodiments, the plurality of cavities 58 may be configured to form a "honeycomb" structure defined by a plurality of side walls 64 (e.g., six side walls 64) extending between the first side 60 and the second side 62 of the primary core portion 56. The plurality of cavities 58 of the primary core portion 56 form resonant cavities (e.g., Helmholtz resonant cavities) that contribute to the dissipation of incident acoustic energy by attenuating acoustically reflected waves and/or by converting acoustic energy into heat energy, such as by Helmholtz resonance.

The core 50 further has one or more secondary core portions 66 which are external to the primary core portion 56 (e.g., the secondary core portion 66 is not located within the plurality of cavities 58 defined by the primary core portion 56). The secondary core portion 66 includes a foam structure which extends between the front skin 52 to the back skin 54 and may contact one or both of the front skin 52 and the back skin 54. In various embodiments, the secondary core portion 66 may be positioned in contact with the primary core portion 56 or, alternatively, may be spaced from the primary core portion 56.

In various embodiments, the foam structure of the secondary core portion 66 may be defined by a syntactic foam. The syntactic foam may include a composite material formed by filling a syntactic foam matrix, such as a metal, a polymer, epoxy resin, or ceramic matrix material, with a plurality of hollow spheres (e.g., "microballoons") or cenospheres. The microballoons may be formed from glass, polymers, ceramic materials, or any other lightweight material suitable for attenuating noise. The present disclosure is not limited to any particular material or combination of materials of the syntactic foam matrix or the microballoons, cenospheres, etc. bound therein. The secondary core portion 66, configured as a syntactic foam, may be substantially malleable in an uncured state, but may become substantially rigid once cured.

The front skin 52 includes a perforated skin portion 68. The perforated skin portion 68 may be positioned coincident with all or substantially all of the primary core portion 56. In other words, the portion of the front skin 52 in contact with the primary core portion 56 may be the perforated skin portion 68. The perforated skin portion 68 of the front skin 52 includes a plurality of apertures 72 extending through the front skin 52 between an exterior of the acoustic panel 48 and the plurality of cavities 58 of the primary core portion 56. Accordingly, the plurality of cavities 58 of the primary core portion 56 are in fluid communication with the exterior of the acoustic panel 48 via the plurality of apertures 72 extending through the front skin 52. In operation, for example, an air stream (e.g., air flowing along the bypass flow path 46) flows across the front skin 52 of the acoustic panel 48 in a shearing direction. Air and/or noise from this air stream may generally enter the plurality of cavities 58 via the plurality of apertures 72 extending through the front skin 52. The plurality of cavities 58, bounded by the back skin 54 and the perforated skin portion 68 of the front skin 52, form resonant cavities (e.g., Helmholtz resonant cavities) which contribute to the dissipation of incident acoustic energy by attenuating acoustic reflected waves.

In various embodiments, the front skin 52 includes an imperforate skin portion 70. The imperforate skin portion 70 may be positioned coincident with all or substantially all of the secondary core portion 66. In other words, the portion of the front skin 52 in contact with or positioned over the secondary core portion 66 may be the imperforate skin portion 70. Unlike the primary core portion 56, the secondary core portion 66 may not require an adjacent perforated portion of the front skin 52 in order to effect acoustic absorption or attenuation of noise proximate the acoustic panel 48. However, in various embodiments, the perforated skin portion 68 of the front skin 52 may additionally be positioned coincident with all or a portion of the secondary core portion 66.

In various embodiments, the acoustic panel 48 may include one or more transition portions 74 of one or both of the front skin 52 and the back skin 54. The transition portion 74 may be defined by a portion of the front skin 52 and/or the back skin 54 which includes at least one curve 76. In various embodiments, because the acoustic panel 48 may be generally curved in order to form an annular array of acoustic panels, the transition portion 74 may correspond to a portion of the acoustic panel 48 where the front skin 52 and/or the back skin 54 represents a locality of greater curvature or curvature in a different direction compared to the surrounding portions of the respective front skin 52 and/or back skin 54. The transition portion 74 may be additionally or alternatively defined by a portion of the front skin 52 and/or the back skin 54 where a distance D between the front skin 52 and the back skin 54 may be inconsistent, for example, where the distance D is inconsistent between the front skin 52 and the back skin 54 along a span (e.g., an axial span, a circumferential span, etc.) of the transition portion 74 between a first transition portion end 78 and a second transition portion end 80.

Referring to FIGS. 5 and 6, the secondary core portion 66 may be disposed within the transition portion 74 of the acoustic panel 48. In various embodiments, the secondary core portion 66 may be in contact with one or both of the front skin 52 and the back skin 54 within the transition portion 74 in order to provide support to the front skin 52 and/or the back skin 54. In various embodiments, the acoustic panel 48 may include a plurality of transition portions 74 each having the secondary core portion 66 disposed therein. In various embodiments, the secondary core portion 66 may additionally or alternatively be disposed in portions of the acoustic panel 48 other than the transition portion 74.

As shown in FIG. 5, in various embodiments, the acoustic panel 48 may include an end portion 82 where the front skin 52 contacts the back skin 54. The acoustic panel 48 may further include the transition portion 74 adjacent the end portion 82 where, for example, the back skin 54 includes a series of curves 76 (e.g., a gooseneck configuration) which bring the back skin 54 into contact with the front skin 52. In various embodiments, the secondary core portion 56 may extend from the primary core portion 56 to the end portion 82 of the acoustic panel 48 and may contact one or both of the primary core portion 56 and the end portion 82 of the acoustic panel 48 where the front skin 52 contacts the back skin 54.

As shown in FIG. 6, in various embodiments, the acoustic panel 48 may include the transition portion 74 at a location of the acoustic panel 48 where, for example, curvature of the acoustic panel 48 may be desirable in order to allow the acoustic panel 48 to conform to the surrounding gas turbine engine 20 structure. The acoustic panel 48 may include a first primary core portion 56, 56A which may be separated from an adjacent second primary core portion 56, 56B by the secondary core portion 66 located at the transition portion 74 of the acoustic panel 48.

Components of the acoustic panel 48, such as such as the front skin 52, the back skin 54, and the primary core portion 56 of the core 50 may be made of a variety of materials, depending upon a particular application, including metals, composites, polymers, and ceramics, however, the present disclosure is not limited to any particular material of the front skin 52, the back skin 54, or the primary core portion 56. In various embodiments, for example, one or both of the front skin 52 and the back skin 54 may be made from a composite material such as, but not limited to, a fiber-reinforced composite material including, for example, a thermoplastic or thermoset matrix with carbon fibers embedded therein. In various embodiments, the primary core portion 56 of the core 50 may be made from a metal such as aluminum or an aluminum alloy, titanium or a titanium alloy, or another suitable lightweight material. In various other embodiments, the primary core portion 56 may be made from one or more non-metallic materials similar to those discussed above with respect to the front skin 52 and the back skin 54.

In conventional methods of forming acoustic panels, the structural characteristics of cellular cores can make designing acoustic panels with complex geometries difficult. In particular, it may be difficult or impossible to locate cellular cores in portions of the acoustic panel which have complex shapes or curves such as "goosenecks," for example. Accordingly, in portions of conventional acoustic panels having complex geometries, the acoustic panels may not include the cellular core at locations having complex geometries. As a result, acoustic panels may lack appreciable acoustic attenuation characteristics in said locations. Additionally, the front and back skins may be relatively unsupported in said locations due to the lack of the cellular core. The lack of structural support provided by the cellular core to the front and back skins can present further complications during conventional acoustic panel manufacture. For example, unsupported portions of the composite front and back skins may collapse or change shape during manufacturing, thereby rendering the acoustic panels unusable due to the tight geometric tolerances required for fitting acoustic panels. To address these complications, manufacturers have used precured composite skins for the front and/or back skin where acoustic panels having complex geometries are required, thereby eliminating the risk of the skin malformation. However, using precured composite skins necessarily requires multiple curing cycles, for example, a curing cycle to form the precured composite skin(s) and at least a second curing cycle once the acoustic panel is assembled.

Figure 7:
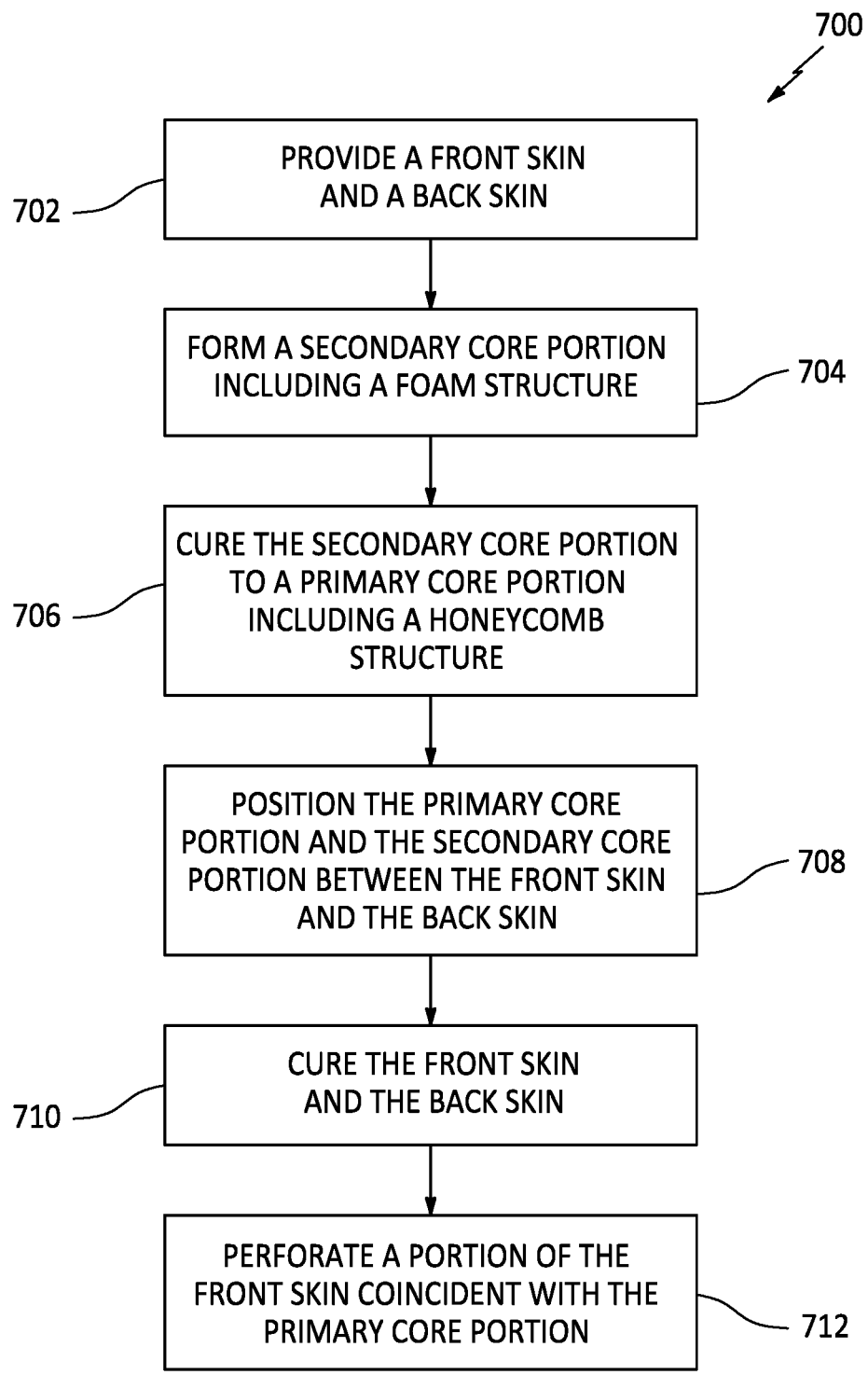
FIG. 7 illustrates a flowchart depicting a method for forming an acoustic panel, in accordance with one or more embodiments of the present disclosure.

Referring to FIGS. 5-7, the present disclosure includes a method 700 for forming an acoustic panel, such as the acoustic panel 48, which addresses one or more of the above-noted difficulties presented by conventional manufacture of acoustic panels having complex geometries. At Step 702, the method 700 includes providing the front skin 52 and the back skin 54. In various embodiments, one or both of the front skin 52 and the back skin 54 may be formed from one or more composite, polymeric, and/or ceramic materials and may be initially provided in an uncured state. Alternatively, in various embodiments, one or both of the front skin 52 and the back skin 54 may have previously been cured.

At Step 704, the method 700 includes forming one or more of the secondary core portion 66. As previously discussed, the secondary core portion 66 includes a foam structure which may be made from or otherwise defined by a syntactic foam. The secondary core portion 66 may be formed with a predetermined geometry (e.g., size and shape) configured to correspond to a predetermined geometry of a respective transition portion 74 of the acoustic panel 48. Tooling may be used to form the secondary core portion 66 with the desired geometry, however, the present disclosure is not limited to any particular method or equipment for forming the secondary core portion 66.

At Step 706, the method 700 includes curing the secondary core portion 66 to one or more of the primary core portion 56, 56A, 56B. The secondary core portion 66 may be bonded to the exterior of the one or more of the primary core portion 56, 56A, 56B or otherwise positioned adjacent the one or more of the primary core portion 56, 56A, 56B. Curing the secondary core portion 66 may include heating the assembled primary and secondary core portions 56, 66 to an elevated temperature and holding the primary and secondary core portions 56, 66 at the elevated temperature for a sufficient time to cure the one or more of the secondary core portions 66. Various temperatures, pressure, and curing times may be used, depending on the materials selected for the secondary core portion 66 foam structure. The secondary core portion 66 may be cured, for example, in an oven or autoclave. The present disclosure is not limited to any particular curing temperatures, pressures, curing times, or equipment. In the cured state, the one or more of the secondary core portion 66 may be fixedly attached to the one or more of the primary core portion 56, forming the assembled core 50.

At Step 708, the method 700 includes assembling the acoustic panel 48 by positioning the core 50 (e.g., the assembly of the one or more of the primary core portion 56 and the cured one or more of the secondary core portion 66) between the front skin 52 and the back skin 54. In various embodiments, Step 708 may include bonding the core 50 to one or both of the front skin 52 and the back skin 54 with a structural adhesive bonding material, for example, a polymer adhesive (e.g., thermoplastic or thermoset epoxy).

At Step 710, the method 700 includes curing the front skin 52 and the back skin 54. Step 710 may include simultaneously curing (i.e., co-curing) the front skin 52 and the back skin 54. Similar to curing the secondary core portion 66, curing the front skin 52 and the back skin 54 may include heating the assembled acoustic panel 48 to an elevated temperature and holding the acoustic panel 48 at the elevated temperature for a sufficient time to cure the front skin 52 and the back skin 54. Various temperatures, pressure, and curing times may be used, depending on the materials selected for the acoustic panel 48 components, and the present disclosure is not limited to any particular curing temperatures, pressures, curing times, or equipment.

As previously discussed, positioning the honeycomb structure of the primary core portion 56 in certain locations of the acoustic panel 48, such as the transition portion 74, may be difficult or impossible due to the size and/or shape of the acoustic panel 48 at those locations. Absent the secondary core portion 66, certain portions of the front skin 52 and/or the back skin 54, such as within the transition portion 74 of the acoustic panel 48, might otherwise be left unsupported prior to and during curing of the front and back skins 52, 54 of the acoustic panel 48. For front skins 52 and/or back skins 54 in an uncured state, a lack of support may cause the front skin 52 and/or the back skin 54 to be susceptible to collapsing, warping, or otherwise shifting to an undesirable geometric configuration prior to completing the curing process for the acoustic panel 48. Accordingly, the foam structure of the second core portion 66 may provide support to one or both of the front skin 52 or the back skin 54 at locations within the acoustic panel 48 which may not be acceptable for placement of the primary core portion 56, thereby allowing co-curing of the front skin 52 and the back skin 54 without the risk of deformation to the front skin 52 and/or the back skin 54. Incorporation of the secondary core portion 66 into geometrically complex portions of the acoustic panel 48 may also provide additional acoustic attenuation in those geometrically complex portions where placement of conventional honeycomb cores may not be possible.

At Step 712, the method 700 includes perforating the perforated skin portion 68 of the front skin 52 to form the plurality of apertures 72. Perforating the perforated skin portion 68 may be performed subsequent to curing the front and back skins 52, 54 of the acoustic panel 48 in Step 710. Alternatively, in various embodiments, perforating the perforated skin portion 68 of the front skin 52 may occur prior to assembling the acoustic panel 48 in Step 708. Further, in various embodiments, the front skin 52 provided in Step 702 may include the plurality of apertures 72 of the perforated skin portion 68. In various embodiments, the plurality of apertures 72 may be formed in the perforated skin portion 68 with a laser such as, for example, an ultra-short pulse laser (USPL). A laser beam of the laser may be used to ablate the material of the front skin 52 sequentially forming each aperture of the plurality of apertures 72 through the front skin 52. The present disclosure is not limited to any particular means for forming the plurality of apertures 72.

The use of the secondary core portion 66, according to the aspects and embodiments of the present disclosure, may allow co-curing of acoustic panel 48 components by supporting the front skin 52 and/or the back skin 54 in one or more transition portions 74 of the acoustic panel 48 and provide additional acoustic attenuation in those transition portions 74 of the acoustic panel 48 where the honeycomb structure of the primary core portion 56 cannot be located. Accordingly, by providing the above-noted benefits, the aspects and embodiments described herein permit acoustic panels to be formed with complex geometric configurations and improved acoustic attenuation properties, and without the need for multiple curing cycles.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. An acoustic panel comprising:
    a front skin comprising a perforated skin portion and an imperforate skin portion, the perforated skin portion comprising a plurality of apertures;
    a back skin; and
    a core positioned between the front skin and the back skin, the core including:
        at least one primary core portion comprising a honeycomb structure defining a plurality of cavities extending from the front skin to the back skin;
        a transition portion defined by at least one curve of one or both of the front skin and the back skin, the front skin separated from the back skin by a distance and the distance is inconsistent within the transition portion along a span of the transition portion from a first transition portion end to a second transition portion end; and
        a secondary core portion external to the at least one primary core portion and comprising a foam structure extending from the front skin to the back skin, the secondary core portion is disposed within the transition portion, the foam structure comprising a syntactic foam contacting the front skin, the back skin, and the at least one primary core portion;
    wherein the perforated skin portion is coincident with the at least one primary core portion and the imperforate skin portion is coincident with the secondary core portion.

2. The acoustic panel of claim 1, wherein the front skin and the back skin comprise a composite material.

3. The acoustic panel of claim 1, wherein the secondary core portion is in contact with both of the front skin and the back skin within the transition portion.

4. The acoustic panel of claim 1, further comprising an end portion where the front skin contacts the back skin, wherein the end portion is adjacent the transition portion.

5. The acoustic panel of claim 4, wherein the secondary core portion extends from the primary core portion to the end portion of the acoustic panel.

6. The acoustic panel of claim 1, wherein the at least one primary core portion comprises a first primary core portion and a second primary core portion and wherein the first primary core portion and the second primary core portion are separated from one another by the transition portion of the acoustic panel and the secondary core portion.

7. A method for forming an acoustic panel, the method comprising:
    providing a front skin and a back skin, the front skin and the back skin defining a transition portion of the acoustic panel, the front skin separated from the back skin by a distance and the distance is inconsistent within the transition portion along a span of the transition portion from a first transition portion end to a second transition portion end;
    assembling the acoustic panel by positioning a core between the front skin and the back skin, the core including:
        at least one primary core portion comprising a honeycomb structure defining a plurality of cavities extending from the front skin to the back skin; and
        a secondary core portion external to the at least one primary core portion and comprising a foam structure extending from the front skin to the back skin, the secondary core portion is disposed within the transition portion, the foam structure comprising a syntactic foam contacting the front skin, the back skin, and the at least one primary core portion;
    simultaneously curing the front skin and the back skin subsequent to assembling the acoustic panel; and
    perforating a perforated skin portion of the front skin to form a plurality of apertures subsequent to simultaneously curing the front skin, the back skin, and the secondary core portion, the perforated skin portion coincident with the primary core portion;

wherein the front skin further comprises an imperforate skin portion coincident with the secondary core portion.

8. The method of claim 7, wherein the front skin and the back skin comprise a composite material.

9. The method of claim 7, wherein the step of providing the front skin and the back skin includes providing the front skin and the back skin in an uncured state.

10. The method of claim 7, wherein the step of assembling the acoustic panel further comprises bonding the front skin and the back skin to the core with a structural adhesive bonding material.

11. The method of claim 7, further comprising curing the secondary core portion to the at least one primary core portion prior to the step of assembling the acoustic panel.

* * * * *